(12) United States Patent
Xu et al.

(10) Patent No.: US 10,050,899 B2
(45) Date of Patent: Aug. 14, 2018

(54) DATA PROCESSING METHOD, APPARATUS, CLIENT, SERVER AND SYSTEM

(71) Applicant: Tencent Technology (Shenzhen) Company Limited, Shenzhen (CN)

(72) Inventors: Jiajie Xu, Shenzhen (CN); Zhonghua Lai, Shenzhen (CN); Runda Cai, Shenzhen (CN); Zhenyu Xu, Shenzhen (CN); Wei Mao, Shenzhen (CN); Dacheng Zhuo, Shenzhen (CN); Deyuan Li, Shenzhen (CN); Qiang Lu, Shenzhen (CN); Wa Ye, Shenzhen (CN); Xuezhu Wu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/174,560

(22) Filed: Jun. 6, 2016

(65) Prior Publication Data
US 2016/0285781 A1   Sep. 29, 2016

Related U.S. Application Data

(63) Continuation of application No. PCT/CN2015/070408, filed on Jan. 9, 2015.

(30) Foreign Application Priority Data

Jan. 9, 2014  (CN) .......................... 2014 1 0009393

(51) Int. Cl.
*G06F 15/173* (2006.01)
*H04L 12/911* (2013.01)
(Continued)

(52) U.S. Cl.
CPC ............. *H04L 47/70* (2013.01); *G06Q 30/06* (2013.01); *H04L 43/0805* (2013.01); *H04L 67/10* (2013.01)

(58) Field of Classification Search
CPC ..... H04L 47/70; H04L 43/0805; H04L 67/10; G06Q 30/06
(Continued)

(56) References Cited

U.S. PATENT DOCUMENTS 7,610,587 B2 * 10/2009 Manuel .......................... 719/315
2002/0049529 A1 * 4/2002 Ikeda ...................... G01C 21/26
701/461
(Continued)

FOREIGN PATENT DOCUMENTS

CN         101699505 A      4/2010
CN         101894335 A      11/2010
(Continued)

OTHER PUBLICATIONS

Tencent Technology, IPRP, PCT/CN2015/070408, Jul. 12, 2016, 6 pgs.
(Continued)

*Primary Examiner* — Thuong Nguyen
(74) *Attorney, Agent, or Firm* — Morgan, Lewis & Bockius LLP

(57) ABSTRACT

The present invention discloses a data processing method, apparatus, client, server and system, which belong to the field of computer technologies. The method includes: a client sending a target object transfer request to a resource platform server; the resource platform server generating a target object transfer instruction accordingly and returning the target object transfer instruction to the client; the client generating an operation instruction according to transfer confirmation performed on the target object transfer instruction and sending the operation instruction to a resource
(Continued)

transfer server; and the resource transfer server transferring, according to the operation instruction, an exchange resource that corresponds to the target object from a first resource account to a second resource account. The present invention solves the problem of low security of a client and a resource platform server developed by a target object provider, and improves the security of a target object transfer process.

15 Claims, 7 Drawing Sheets

(51) Int. Cl.
*H04L 12/26* (2006.01)
*H04L 29/08* (2006.01)
*G06Q 30/06* (2012.01)

(58) Field of Classification Search
USPC .......................... 709/206, 219; 707/704, 803
See application file for complete search history.

(56) References Cited

U.S. PATENT DOCUMENTS

2006/0233311 A1* 10/2006 Adams, Jr. .......... H04L 12/2697
    379/21
2009/0119188 A1* 5/2009 Pagan ................ G06Q 30/0601
    705/26.1
2009/0171810 A1* 7/2009 Mengerink ............ G06Q 20/10
    705/26.1
2014/0058951 A1* 2/2014 Kuppuswamy ...... G06Q 20/223
    705/67
2014/0214664 A1* 7/2014 Kim .................... G06Q 20/363
    705/41
2014/0351312 A1* 11/2014 Lu .......................... H04W 4/005
    709/201
2016/0203534 A1* 7/2016 Wong .................... G06Q 30/06
    705/26.35

FOREIGN PATENT DOCUMENTS

CN        102999838 A    3/2013
EP          1235170 A1    8/2002

OTHER PUBLICATIONS

Tencent Technology, ISRWO, PCT/CN2015/070408, Apr. 8, 2015, 8 pgs.

* cited by examiner

DATA PROCESSING METHOD, APPARATUS, CLIENT, SERVER AND SYSTEM

PRIORITY CLAIM AND RELATED APPLICATION

This application is a continuation application of PCT Patent Application No. PCT/CN2015/070408, entitled "DATA PROCESSING METHOD, APPARATUS, CLIENT, SERVER AND SYSTEM" filed on Jan. 9, 2015, which claims priority to Chinese Patent Application No. 201410009393.2, entitled "DATA PROCESSING METHOD, APPARATUS, CLIENT, SERVER AND SYSTEM" filed on Jan. 9, 2014, both of which are incorporated by reference in their entirety.

FIELD OF THE INVENTION

The present invention relates to the field of computer technologies, and in particular, to a data processing method, apparatus, client, server and system.

BACKGROUND OF THE INVENTION

With the development of web technologies, web applications for target object transfer are becoming more and more popular among users. The target object transfer refers to that a target object provider releases target object information on the web in advance, and after a user triggers an operation of transferring a target object, an exchange resource is transferred from a first resource account associated with the user to a second resource account associated with the target object provider, and in this way, the user acquires the target object that needs to be transferred.

If the target object provider needs to release target object information to an application repository such as the Apple application repository, because it is stipulated in the application repository that a resource transfer server provided by the application repository should be used in a transfer process of a target object released in the application repository, the target object provider needs to develop a client and a resource platform server, so as to implement transfer of the target object. Specifically, the client developed by the target object provider displays target object information, and sends a target object transfer request to the resource platform server when receiving a user-triggered transfer operation of transferring the target object; the resource platform server generates a target object transfer instruction according to the target object transfer request, and sends the target object transfer instruction to the client; the client sends the target object transfer instruction to the resource transfer server, so that the resource transfer server is triggered, according to the target object transfer instruction, to transfer the target object.

During the implementation of the present invention, the inventor finds that the prior art at least has the following defects:

To transfer a target object by using a resource transfer server, each target object provider needs to develop a suite of client and resource platform server; clients and resource platform servers developed by some target object providers are insecure due to limited development capabilities of the target object providers, and may cause leakage of private information such as resource accounts of users.

SUMMARY

To solve the problem that clients and resource platform servers developed by some target object providers are insecure and may cause leakage of private information such as resource accounts of users, embodiments of the present invention provide a data processing method, apparatus, client, server, and system. The technical solutions are as follows:

According to a first aspect, an embodiment of the present invention provides a data processing method, where a target object provider releases target object information on a resource platform server and a resource transfer server, the method including:

a client sending a target object transfer request to the resource platform server, where the target object transfer request carries an account identifier of the client and attribute information of the target object;

the resource platform server receiving the target object transfer request, and generating a target object transfer instruction according to the target object transfer request and sending the target object transfer instruction to the client, where the target object transfer instruction includes target object transfer information, and the target object transfer information includes exchange resource information corresponding to the target object;

the client receiving the target object transfer instruction, generating an operation instruction according to transfer confirmation performed on the target object transfer information carried in the target object transfer instruction, and sending the operation instruction to the resource transfer server; and the resource transfer server receiving the operation instruction, transferring, according to the operation instruction, an exchange resource that corresponds to the target object from a first resource account associated with the account identifier of the client to a second resource account associated with the target object provider, and returning, to the client, information indicating that the exchange resource is transferred successfully.

According to a second aspect, an embodiment of the present invention provides a data processing method, used in a resource platform server, where a target object provider releases target object information on the resource platform server and a resource transfer server, the method including:

receiving a target object transfer request sent by a client, where the target object transfer request carries an account identifier of the client and attribute information of the target object; and generating a target object transfer instruction according to the target object transfer request and sending the target object transfer instruction to the client, where the target object transfer instruction includes target object transfer information, and the target object transfer information includes exchange resource information corresponding to the target object, so that the client receives the target object transfer instruction, generates an operation instruction according to transfer confirmation performed on the target object transfer information carried in the target object transfer instruction, and sends the operation instruction to the resource transfer server, and the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

According to a third aspect, an embodiment of the present invention provides a data processing method, used in a client, where a target object provider releases target object information on a resource platform server and a resource transfer server, the method including:

sending a target object transfer request to the resource platform server, where the target object transfer request carries an account identifier of the client and attribute information of the target object;

receiving a target object transfer instruction sent by the resource platform server, where the target object transfer instruction is generated by the resource platform server according to the target object transfer request and sent to the client, the target object transfer instruction includes target object transfer information, and the target object transfer information includes exchange resource information corresponding to the target object; and generating an operation instruction according to transfer confirmation performed on the target object transfer information carried in the target object transfer instruction, and sending the operation instruction to the resource transfer server, so that the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

According to a fourth aspect, an embodiment of the present invention provides a data processing system, where a target object provider releases target object information on a resource platform server and a resource transfer server, the system including:

a client, configured to send a target object transfer request to the resource platform server, where the target object transfer request carries an account identifier of the client and attribute information of the target object;

the resource platform server, configured to receive the target object transfer request, and generate a target object transfer instruction according to the target object transfer request and send the target object transfer instruction to the client, where the target object transfer instruction includes target object transfer information, and the target object transfer information includes exchange resource information corresponding to the target object;

where the client is further configured to receive the target object transfer instruction, generate an operation instruction according to transfer confirmation performed on the target object transfer information carried in the target object transfer instruction, and send the operation instruction to the resource transfer server; and the resource transfer server, configured to receive the operation instruction, transfer, according to the operation instruction, an exchange resource that corresponds to the target object from a first resource account associated with the account identifier of the client to a second resource account associated with the target object provider, and return, to the client, information indicating that the exchange resource is transferred successfully.

According to a fifth aspect, an embodiment of the present invention provides a data processing apparatus, used in a resource platform server, where a target object provider releases target object information on the resource platform server and a resource transfer server, the apparatus including:

a first receiving module, configured to receive a target object transfer request sent by a client, where the target object transfer request carries an account identifier of the client and attribute information of the target object; and an instruction sending module, configured to generate a target object transfer instruction according to the target object transfer request received by the first receiving module and send the target object transfer instruction to the client, where the target object transfer instruction includes target object transfer information, and the target object transfer information includes exchange resource information corresponding to the target object, so that the client receives the target object transfer instruction, generates an operation instruction according to transfer confirmation performed on the target object transfer information carried in the target object transfer instruction, and sends the operation instruction to the resource transfer server, and the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

According to a six aspect, an embodiment of the present invention provides a data processing apparatus, used in a client, where a target object provider releases target object information on a resource platform server and a resource transfer server, the apparatus including:

a first sending module, configured to send a target object transfer request to the resource platform server, where the target object transfer request carries an account identifier of the client and attribute information of the target object;

an instruction receiving module, configured to receive a target object transfer instruction sent by the resource platform server, where the target object transfer instruction is generated by the resource platform server according to the target object transfer request sent by the first sending module and is sent to the client, the target object transfer instruction includes target object transfer information, and the target object transfer information includes exchange resource information corresponding to the target object; and a second sending module, configured to generate an operation instruction according to transfer confirmation performed on the target object transfer information carried in the target object transfer instruction received by the instruction receiving module, and send the operation instruction to the resource transfer server, so that the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

A target object provider releases target object information on a resource platform server and a resource transfer server; a client sends a target object transfer request to the resource platform server; the resource platform server generates a target object transfer instruction according to the target object transfer request and sends the target object transfer instruction to the client; the client generates an operation instruction according to transfer confirmation performed on target object transfer information carried in the target object transfer instruction and sends the operation instruction to the resource transfer server; and the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

BRIEF DESCRIPTION OF THE DRAWINGS

To describe the technical solutions of the embodiments of the present invention more clearly, the accompanying drawings for illustrating the embodiments will be introduced briefly in the following. Apparently, the drawings in the following description are only some embodiments of the present invention, and a person of ordinary skill in the art may obtain other drawings based on these accompanying drawings without creative efforts.

DESCRIPTION OF EMBODIMENTS

To make the objectives, technical solutions, and advantages of the present invention clearer, implementation manners of the present invention are described in further detail below with reference to the accompanying drawings.

Figure 1:
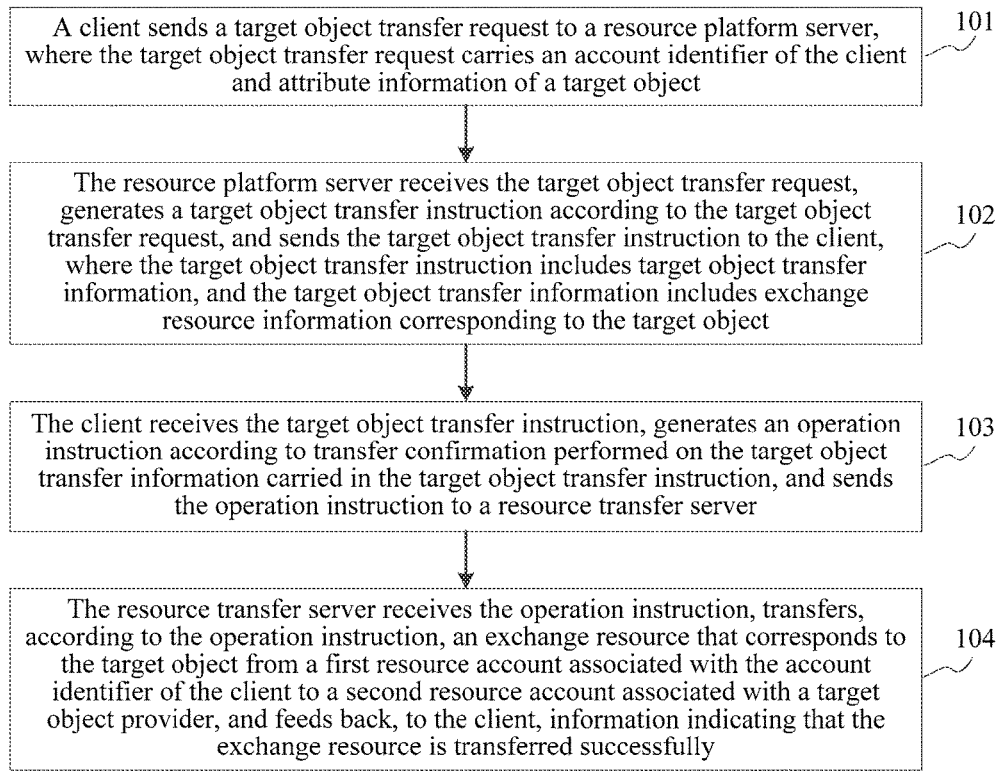
FIG. 1 is a method flowchart of a data processing method according to an embodiment of the present invention.

Referring to FIG. 1, FIG. 1 shows a method flowchart of a data processing method according to an embodiment of the present invention, where the data processing method is applicable to a data processing system that includes a client, a resource platform server, and a resource transfer server. The data processing method includes the following steps:

Step 101: A client sends a target object transfer request to a resource platform server, where the target object transfer request carries an account identifier of the client and attribute information of a target object.

The account identifier of the client is used to indicate a user account for login to the client, namely, a user account that receives a transferred target object by using the client. The target object is an object such as an emoticon, game equipment, a membership service, and a toy, and is provided by a target object provider.

In this embodiment, at least one target object provider releases target object information on the resource platform server and a resource transfer server. Each piece of target object information released by the target object provider includes an identifier of a target object, a name of the target object, the quantity of the target objects, exchange resource information corresponding to the target object, image-text introduction information about the target object, and the like. To enable the resource platform server to determine a specific target object that needs to be transferred to the client, the client further needs to add attribute information of a target object to the target object transfer request, where the attribute information carries information such as an identifier of the target object and the quantity of the target objects, so that the resource platform server finds, according to the received attribute information, released target object information, thereby determining the target object. The resource transfer server is a server corresponding to an application repository, and is configured to transfer, among resources in a first resource account which is used for login to the application repository and is associated with the account identifier, an exchange resource that corresponds to the target object, and after the resource is transferred successfully, trigger the resource platform server to send, to the client, the target object released by the target object provider. The application repository is a database that provides application programs for downloading. For example, the application repository may provide a client for downloading.

Step 102: The resource platform server receives the target object transfer request, generates a target object transfer instruction according to the target object transfer request, and sends the target object transfer instruction to the client, where the target object transfer instruction includes target object transfer information, and the target object transfer information includes exchange resource information corresponding to the target object.

The resource platform server generates target object transfer information according to the attribute information carried in the target object transfer request, adds the target object transfer information to the target object transfer instruction, and sends the target object transfer instruction the client indicated by the account identifier of the client.

Specifically, the resource platform server determines the target object according to a target object identifier included in the attribute information, searches target object information that is released in advance for target object information that includes the target object identifier, generates target object transfer information according to the exchange resource information, the target object identifier, and a target object name that are corresponding to the target object and included in the found target object information and information, such as the quantity of the target objects, included in the attribute information, and then generates a target object transfer instruction according to the target object transfer information.

Step 103: The client receives the target object transfer instruction, generates an operation instruction according to transfer confirmation performed on the target object transfer information carried in the target object transfer instruction, and sends the operation instruction to a resource transfer server.

After determining that the received target object transfer instruction is from the resource platform server rather than a malicious website, the client displays the target object transfer information carried in the target object transfer instruction, where the target object transfer information includes an exchange resource corresponding to the target object. A user performs transfer confirmation after determining that the target object transfer information is correct, and the client generates an operation instruction according to the transfer confirmation and sends the operation instruction to the resource transfer server. The operation instruction carries the target object transfer information and a first resource account associated with the account identifier. Because the client processes the target object transfer instruction only when determining that the target object transfer instruction is from the resource platform server, it is prevented that a malicious website defrauds a user of an exchange resource by sending a target object transfer instruction to the client, thereby ensuring the security of processing the target object transfer instruction.

Step 104: The resource transfer server receives the operation instruction, transfers, according to the operation instruction, an exchange resource that corresponds to the target object from a fast resource account associated with the account identifier of the client to a second resource account associated with a target object provider, and returns, to the client, information indicating that the exchange resource is transferred successfully.

The resource transfer server reads the first resource account and the exchange resource information that are carried in the operation instruction, acquires the second resource account associated with the target object provider, transfers the exchange resource that corresponds to the target object from the first resource account to the second resource account associated with the target object provider, and returns, to the client, the information indicating that the exchange resource is transferred successfully.

In summary, in the data processing method provided by this embodiment of the present invention, a target object provider releases target object information on a resource platform server and a resource transfer server; a client sends a target object transfer request to the resource platform server; the resource platform server generates a target object transfer instruction according to the target object transfer request and sends the target object transfer instruction to the client; the client generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

Figure 2:
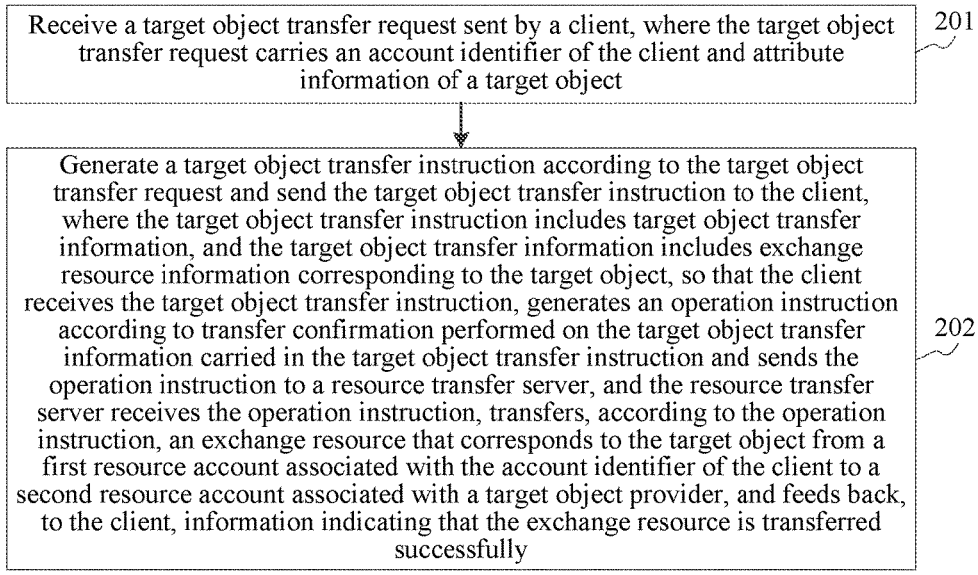
FIG. 2 is a method flowchart of a data processing method according to an embodiment of the present invention.

Referring to FIG. 2, FIG. 2 shows a method flowchart of a data processing method according to an embodiment of the present invention, where the data processing method is applicable to a resource platform server. The data processing method includes the following steps:

Step 201: Receive a target object transfer request sent by a client, where the target object transfer request carries an account identifier of the client and attribute information of a target object.

The account identifier of the client is used to indicate a user account for login to the client, namely, a user account that receives a transferred target object by using the client. The target object is an object such as an emoticon, game equipment, a membership service, and a toy, and is provided by a target object provider.

In this embodiment, at least one target object provider releases target object information on a resource platform server and a resource transfer server. Each piece of target object information released by the target object provider includes an identifier of a target object, a name of the target object, the quantity of the target objects, exchange resource information corresponding to the target object, image-text introduction information about the target object, and the like. To enable the resource platform server to determine a specific target object that needs to be transferred to the client, the client further needs to add attribute information of a target object to the target object transfer request, where the attribute information carries information such as an identifier of the target object and the quantity of the target objects, so that the resource platform server finds, according to the received attribute information, released target object information, thereby determining the target object. The resource transfer server is a server corresponding to an application repository, and is configured to transfer, among resources in a first resource account which is used for login to the application repository and is associated with the account identifier, an exchange resource that corresponds to the target object, and after the resource is transferred successfully, trigger the resource platform server to send, to the client, the target object released by the target object provider. The application repository is a database that provides application programs for downloading. For example, the application repository may provide a client for downloading.

Step 202: Generate a target object transfer instruction according to the target object transfer request and send the target object transfer instruction to the client, where the target object transfer instruction includes target object transfer information, and the target object transfer information includes exchange resource information corresponding to the target object, so that the client receives the target object transfer instruction, generates an operation instruction according to transfer confirmation performed on the target object transfer information carried in the target object transfer instruction and sends the operation instruction to a resource transfer server, and the resource transfer server receives the operation instruction, transfers, according to the operation instruction, an exchange resource that corresponds to the target object from a first resource account associated with the account identifier of the client to a second resource account associated with a target object provider, and returns, to the client, information indicating that the exchange resource is transferred successfully.

The resource platform server generates the target object transfer information according to the attribute information carried in the target object transfer request, adds the target object transfer information to the target object transfer instruction, and sends the target object transfer instruction to the client indicated by the account identifier of the client. After determining that the received target object transfer instruction is from the resource platform server rather than a malicious website, the client displays the target object transfer information carried in the target object transfer instruction, where the target object transfer information includes an exchange resource corresponding to the target object. A user performs transfer confirmation after determining that the target object transfer information is correct, and the client generates an operation instruction according to the transfer confirmation and sends the operation instruction to the resource transfer server. The operation instruction carries the target object transfer information and the first resource account associated with the account identifier. The resource transfer server transfers the exchange resource that corresponds to the target object from the first resource account associated with the account identifier of the client to the second resource account associated with the target object provider, and returns, to the client, the information indicating that the exchange resource is transferred successfully. Because the client processes the target object transfer instruction only when determining that the target object transfer instruction is from the resource platform server, it is prevented that a malicious website defrauds a user of an exchange resource by sending a target object transfer instruction to the client, thereby ensuring the security of processing the target object transfer instruction.

When the target object information is released on the resource transfer server, the resource transfer server should be used during resource transfer, and to use the resource transfer server, a client and a resource platform server need to be developed. Because each target object provider has a different capability of developing a client and a resource platform server, even if the target object provider spends a lot of money to develop a client and a resource platform server, if the developed client and resource platform server are of low security, the client and resource platform server may still cause leakage of private information such as resource accounts of users. Therefore, this embodiment provides a client and a resource platform server specifically used for target object transfer, and the target object provider does not need to spend extra money on development, but only needs to release target object information on the resource platform server. Moreover, the client and the resource platform server provided by this embodiment are highly secure, thereby improving the security of a target object transfer process.

In summary, in the data processing method provided by this embodiment of the present invention, a target object provider releases target object information on a resource platform server and a resource transfer server; the resource platform server receives a target object transfer request sent by a client, generates a target object transfer instruction according to the target object transfer request and sends the target object transfer instruction to the client; the client generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

Figure 3:
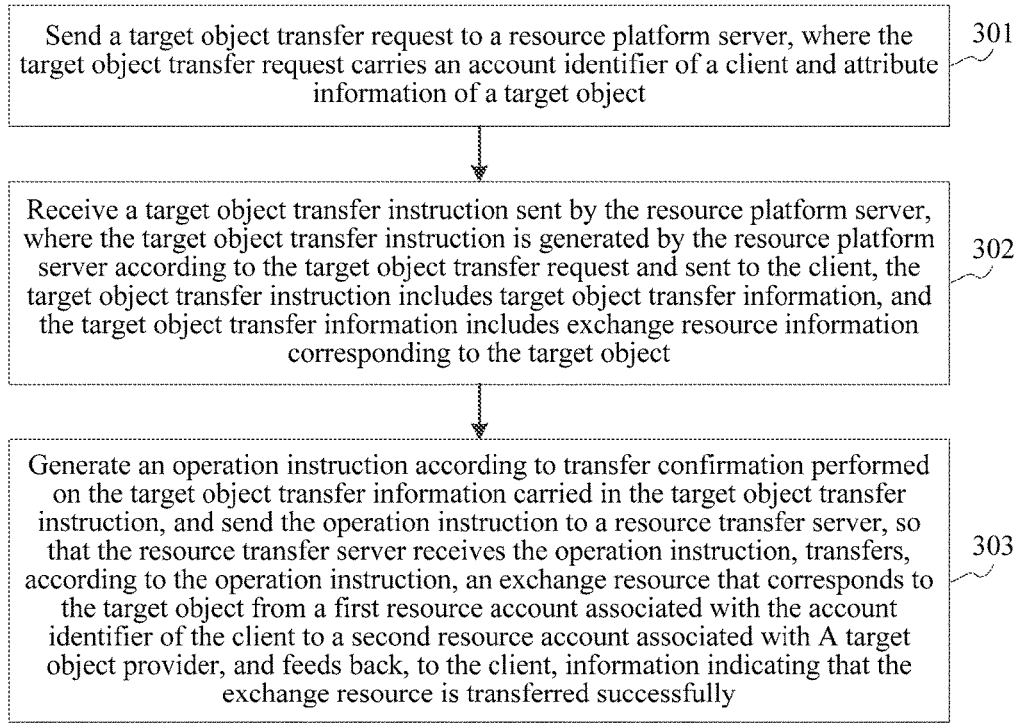
FIG. 3 is a method flowchart of a data processing method according to an embodiment of the present invention.

Referring to FIG. 3, FIG. 3 shows a method flowchart of a data processing method according to an embodiment of the present invention, where the data processing method is applicable to a client. The data processing method includes the following steps:

Step 301: Send a target object transfer request to a resource platform server, where the target object transfer request carries an account identifier of a client and attribute information of a target object.

The account identifier of the client is used to indicate a user account for login to the client, namely, a user account that receives a transferred target object by using the client. The target object is an object such as an emoticon, game equipment, a membership service, and a toy, and is provided by a target object provider.

In this embodiment, at least one target object provider releases target object information on a resource platform server and a resource transfer server. Each piece of target object information released by the target object provider includes an identifier of a target object, a name of the target object, the quantity of the target objects, exchange resource information corresponding to the target object, image-text introduction information about the target object, and the like. To enable the resource platform server to determine a specific target object that needs to be transferred to the client, the client further needs to add attribute information of a target object to the target object transfer request, where the attribute information carries information such as an identifier of the target object and the quantity of the target objects, so that the resource platform server finds, according to the received attribute information, released target object information, thereby determining the target object. The resource transfer server is a server corresponding to an application repository, and is configured to transfer, among resources in a first resource account which is used for login to the application repository and is associated with the account identifier, an exchange resource that corresponds to the target object, and after the resource is transferred successfully, trigger the resource platform server to send, to the client, the target object released by the target object provider. The application repository is a database that provides application programs for downloading. For example, the application repository may provide a client for downloading.

Step 302: Receive a target object transfer instruction sent by the resource platform server, where the target object transfer instruction is generated by the resource platform server according to the target object transfer request and sent to the client, the target object transfer instruction includes target object transfer information, and the target object transfer information includes exchange resource information corresponding to the target object.

The client receives the target object transfer instruction, and after determining that the received target object transfer instruction is from the resource platform server rather than a malicious website, the client processes the target object transfer instruction, which prevents that a malicious website defrauds a user of an exchange resource by sending a target object transfer instruction to the client, thereby ensuring the security of processing the target object transfer instruction. The target object transfer instruction is obtained by the resource platform server by generating target object transfer information according to the attribute information carried in the target object transfer request and adding the target object transfer information to the target object transfer instruction.

Step 303: Generate an operation instruction according to transfer confirmation performed on the target object transfer information carried in the target object transfer instruction, and send the operation instruction to a resource transfer server, so that the resource transfer server receives the operation instruction, transfers, according to the operation instruction, an exchange resource that corresponds to the target object from a first resource account associated with the account identifier of the client to a second resource account associated with a target object provider, and returns, to the client, information indicating that the exchange resource is transferred successfully.

The client displays the target object transfer information carried in the target object transfer instruction, where the target object transfer information includes the exchange resource corresponding to the target object. A user performs transfer confirmation after determining that the target object transfer information is correct. The client generates an operation instruction according to the transfer confirmation and sends the operation instruction to the resource transfer server. The operation instruction carries the target object transfer information and the first resource account associated with the account identifier. The resource transfer server transfers the exchange resource that corresponds to the target object from the first resource account associated with the account identifier of the client to the second resource account associated with the target object provider, and returns, to the client, the information indicating that the exchange resource is transferred successfully.

When the target object information is released on the resource transfer server, the resource transfer server should be used during resource transfer, and to use the resource transfer server, a client and a resource platform server need to be developed. Because each target object provider has a different capability of developing a client and a resource platform server, even if the target object provider spends a lot of money to develop a client and a resource platform server, if the developed client and resource platform server are of low security, the client and the resource platform server may still cause leakage of private information such as resource accounts of users. Therefore, this embodiment provides a client and a resource platform server specifically used for target object transfer, and the target object provider does not need to spend extra money on development, but only needs to release target object information on the resource platform server. Moreover, the client and the resource platform server provided by this embodiment are highly secure, thereby improving the security of a target object transfer process.

In summary, in the data processing method provided by this embodiment of the present invention, a target object provider releases target object information on a resource platform server and a resource transfer server; a client sends a target object transfer request to the resource platform server, receives a target object transfer instruction that is generated by the resource platform server according to the target object transfer request, generates an operation instruction according to transfer confirmation performed on target object transfer information carried in the target object transfer instruction, and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

Figure 4A:
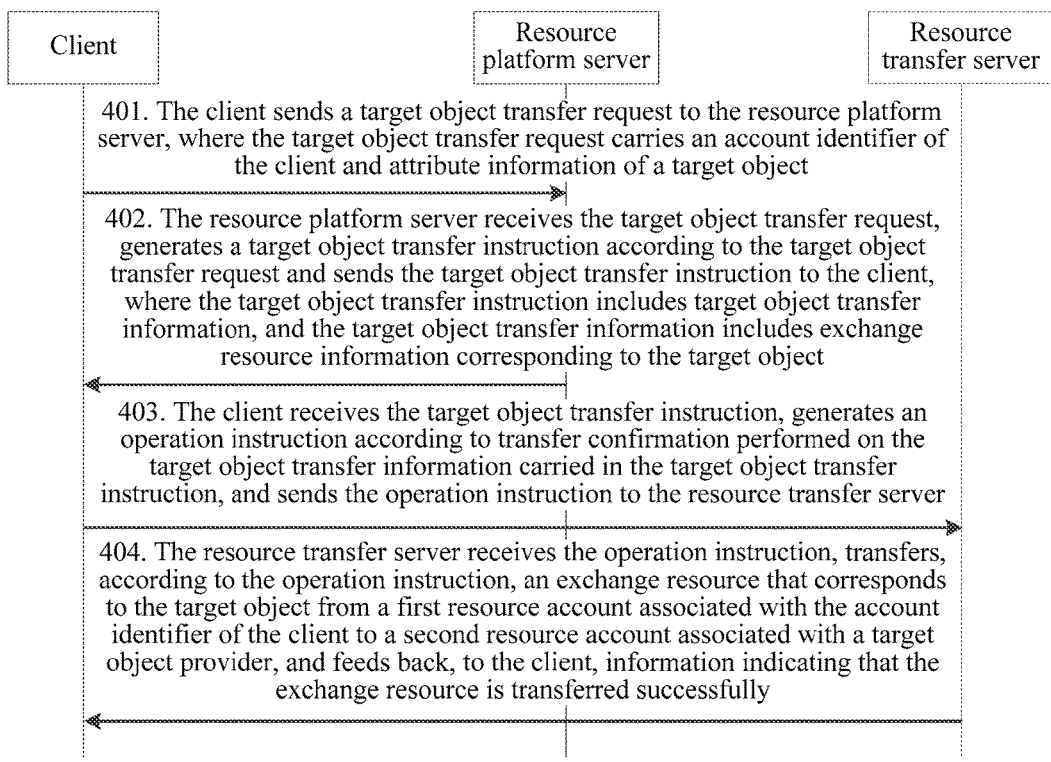
FIG. 4A is a method flowchart of a data processing method according to an embodiment of the present invention.

Referring FIG. 4A, FIG. 4A is a method flowchart of a data processing method according to an embodiment of the present invention, where the data processing method is applicable to a data processing system that includes a client, a resource platform server, and a resource transfer server. The data processing method includes the following steps:

Step 401: A client sends a target object transfer request to a resource platform server, where the target object transfer request carries an account identifier of the client and attribute information of a target object.

The account identifier of the client is used to indicate a user account for login to the client, namely, a user account that receives a transferred target object by using the client. The target object is an object such as an emoticon, game equipment, a membership service, and a toy, and is provided by a target object provider.

In this embodiment, at least one target object provider releases target object information on a resource platform server and a resource transfer server. Each piece of target object information released by the target object provider includes an identifier of a target object, a name of the target object, the quantity of the target objects, exchange resource information corresponding to the target object, image-text introduction information about the target object, and the like. To enable the resource platform server to determine a specific target object that needs to be transferred to the client, the client further needs to add attribute information of a target object to the target object transfer request, where the attribute information carries information such as an identifier of the target object and the quantity of the target objects, so that the resource platform server finds, according to the received attribute information, released target object information, thereby determining the target object. The resource transfer server is a server corresponding to an application repository, and is configured to transfer, among resources in a first resource account which is used for login to the application repository and is associated with the account identifier, an exchange resource that corresponds to the target object, and after the resource is transferred successfully, trigger the resource platform server to send, to the client, the target object released by the target object provider. The application repository is a database that provides application programs for downloading. For example, the application repository may provide a client for downloading.

Specifically, the target object provider may also release target object information to a browser, and when browsing the target object information by using the browser, a user selects a target object that needs to be transferred. The browser sends, to the client, a target object transfer request for transferring the target object. The browser may be an embedded browser in the client, and may also be an external browser not included in the client.

Step 402: The resource platform server receives the target object transfer request, generates a target object transfer instruction according to the target object transfer request and sends the target object transfer instruction to the client, where the target object transfer instruction includes target object transfer information, and the target object transfer information includes exchange resource information corresponding to the target object.

The resource platform server generates target object transfer information according to the attribute information carried in the target object transfer request, adds the target object transfer information to the target object transfer instruction, and sends the target object transfer instruction to the client indicated by the account identifier of the client.

Specifically, the resource platform server determines the target object according to a target object identifier included in the attribute information, searches target object information that is released in advance for target object information that includes the target object identifier, generates target object transfer information according to the exchange resource information, the target object identifier, and a target object name that are corresponding to the target object and included in the found target object information and information, such as the quantity of the target objects, included in the attribute information, and then generates a target object transfer instruction according to the target object transfer information.

The resource transfer server has a maintenance policy for target object information, for example, the resource transfer server deletes or modifies a given target object. Therefore, to make it clear whether the resource transfer server deletes or modifies target object information so as to determine whether the target object information is maintained by the resource transfer server and avoid a waste of processing resources caused by transfer of a target object that is not maintained by the resource transfer server, the resource platform server needs to verify the target object information. Specifically, that the resource platform server generates a target object transfer instruction according to the target object transfer request and sends the target object transfer instruction to the client includes:

1) The resource platform server acquires the target object identifier included in the attribute information, and sends the target object identifier to the resource transfer server.

2) The resource transfer server searches each piece of pre-stored target object information for target object information that includes the target object identifier, and if target object information that includes the target object identifier is found, the resource transfer server sends the found target object information to the resource platform server.

3) The resource platform server receives the found target object information, and searches each piece of pre-stored target object information for target object information the same as the found target object information, and if target object information the same as the found target object information is found, the resource platform server generates the target object transfer instruction according to the target object information and the account identifier and sends the target object transfer instruction to the client.

The target object information sent by the resource transfer server to the resource platform server may include the target object identifier, and the exchange resource information and the like corresponding to the target object. The resource platform server searches for, according to the target object identifier, local target object information that also includes a target object identifier, and exchange resource information and the like corresponding to the target object. The resource platform server detects whether each item of information in the received target object information is the same as each item of information in the locally found target object information, and if it is detected that each item of information in the received target object information is the same as each item of information in the locally found target object information, the resource platform server determines that the resource transfer server does not modify the target object information, generates target object transfer information according to the target object information and the attribute information, and then generates a target object transfer instruction according to the target object transfer information.

In this embodiment, before the resource platform server acquires the target object identifier included in the target object information, the method further includes:

1) The resource platform server receives and stores at least one target object and target object information of each target object that are sent by the target object provider, and sends each piece of target object information to the resource transfer server.

2) The resource transfer server receives and stores each piece of target object information.

The target object provider sends each piece of edited target object information and each target object to the resource platform server, and the resource platform server stores the received target object and target object information, where the target object in the resource platform server is used to be sent to the client, and the target object information in the resource platform server is used for generating the target object transfer instruction.

In addition, the resource platform server further sends the target object information to the resource transfer server, and the resource transfer server stores the target object information.

Step 403: The client receives the target object transfer instruction, generates an operation instruction according to transfer confirmation performed on the target object transfer information carried in the target object transfer instruction, and sends the operation instruction to a resource transfer server.

After determining that the received target object transfer instruction is from the resource platform server rather than a malicious website, the client displays the target object transfer information carried in the target object transfer instruction, where the target object transfer information includes an exchange resource corresponding to the target object. A user performs transfer confirmation after determining that the target object transfer information is correct, and the client generates an operation instruction according to the transfer confirmation and sends the operation instruction to the resource transfer server. The operation instruction carries the target object transfer information and a first resource account associated with the account identifier. Because the client processes the target object transfer instruction only when determining that the target object transfer instruction is from the resource platform server, it is prevented that a malicious website defrauds a user of an exchange resource by sending a target object transfer instruction to the client, thereby ensuring the security of processing the target object transfer instruction.

Specifically, the generating an operation instruction according to transfer confirmation performed on the target object transfer information carried in the target object transfer instruction includes that:

The client determines that transfer confirmation performed on the target object transfer information is received when the target object transfer instruction is triggered, displays an input interface that is provided in advance by the resource transfer server for the client and is used for inputting the first resource account, and generates the operation instruction according to the target object transfer information and the input first resource account.

The client may display, in a display interface, the target object transfer information and a confirmation option for "transfer"; if the user confirms that the target object transfer information is correct, the user clicks the confirmation option; after receiving a click signal, the client determines that the target object transfer instruction is triggered, that is, transfer confirmation performed on the target object transfer information is received. The client then displays, in the display interface, the input interface that is provided in advance by the resource transfer server for the client, where the input interface is used by the user to input the first resource account, and the first resource account includes information such as an account name and a password. The client generates the operation instruction according to the target object transfer information and the input first resource account.

It should be additionally noted that, it is stipulated in an application repository that, a resource transfer server should be used for transfer of a virtual object, so that the resource transfer server can acquire a corresponding proportion of resource from a transferred exchange resource. Therefore, to prevent the resource transfer server from occupying resources when the target object is a non-virtual object, in this embodiment, the target object transfer information may further carry type information of the target object; when determining, according to the type information, that the target object is a virtual object, the client transfers the exchange resource through the resource transfer server; and when determining, according to the type information, that the target object is a non-virtual object, the client transfers the exchange resource that corresponds to the target object through another server.

Step 404: The resource transfer server receives the operation instruction, transfers, according to the operation instruction, an exchange resource that corresponds to the target object from a first resource account associated with the account identifier of the client to a second resource account associated with a target object provider, and returns, to the client, information indicating that the exchange resource is transferred successfully.

The resource transfer server reads the first resource account and the exchange resource information carried in the operation instruction, acquires the second resource account associated with the target object provider, transfers the exchange resource that corresponds to the target object from the first resource account to the second resource account associated with the target object provider, and returns, to the client, the information indicating that the exchange resource is transferred successfully.

Step 405: The client sends a target object acquiring request to the resource platform server, where the target object acquiring request carries the target object transfer information.

The client sends the target object acquiring request to the resource platform server after receiving information feedback sent by the resource transfer server. To enable the resource platform server to determine the target object that needs to be sent, the target object acquiring request may carry the target object transfer information.

Step 406: The resource platform server sends the received target object acquiring request to the resource transfer server.

The resource platform server may directly send the target object to the client according to the target object transfer information. Further, the operation of sending the target object by the resource platform server needs to be based on the operation of transferring, from the first resource account, the exchange resource that corresponds to the target object. Therefore, the resource platform server further needs to detect whether the exchange resource that corresponds to the target object has been transferred from the first resource account. In this case, the resource platform server may send the target object acquiring request to the resource transfer server.

Step 407: The resource transfer server receives the target object acquiring request, searches each piece of pre-recorded target object transfer information for the target object transfer information carried in the target object acquiring request, and if the target object transfer information carried in the target object acquiring request is found, sends target object transfer confirmation information to the resource platform server.

Each time after transferring an exchange resource from the first resource account, the resource transfer server records the exchange resource information and target object transfer information to which the first resource account belongs. Therefore, the resource transfer server may search each piece of pre-recorded target object transfer information for the target object transfer information carried in the target object acquiring request, and if the target object transfer information carried in the target object acquiring request is found, the resource transfer server sends the target object transfer confirmation information to the resource platform server.

Further, to save resources occupied when the resource transfer server searches for the target object transfer information, the resource transfer server may further acquire identification information included in the target object transfer information, and detect whether the identification information exists; if a result of the detection indicates that the identification information exists, the resource transfer server sends the target object transfer confirmation information to the resource platform server.

Step 408: The resource platform server sends the target object to the client according to the received target object transfer confirmation information.

The resource platform server determines, according to the received target object transfer confirmation information, that the exchange resource corresponding to the target object has been transferred out of the first resource account. In this case, the resource platform server sends the target object to the client according to the target object transfer information. The client sends the received target object to the browser, and the browser displays the target object.

Further, after sending the object to the client, the resource platform server further needs to modify an information state of the target object transfer information to a state of being transferred successfully. Further, the resource platform server may further send, to the target object provider, a notification indicating that the target object has been sent to the client, so that the target object provider learns clearly which target object is sent to which client.

In this embodiment, steps 401, 403, and 405 may be performed by the client independently; steps 402, 406, and 408 may be performed by the resource platform server independently; and steps 404 and 407 may be performed by the resource transfer server independently.

In summary, in the data processing method provided by this embodiment of the present invention, a target object provider releases target object information on a resource platform server and a resource transfer server; a client sends a target object transfer request to the resource platform server; the resource platform server generates a target object transfer instruction according to the target object transfer request and sends the target object transfer instruction to the client; the client generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process. In addition, the resource platform server searches locally for target object information the same as target object information sent by the resource transfer server, and in this way, a target object can be transferred when it is determined that the resource transfer server maintains the target object information, thereby avoiding a waste of processing resources caused by transfer of a target object that is not maintained by the resource transfer server.

Figure 4B:
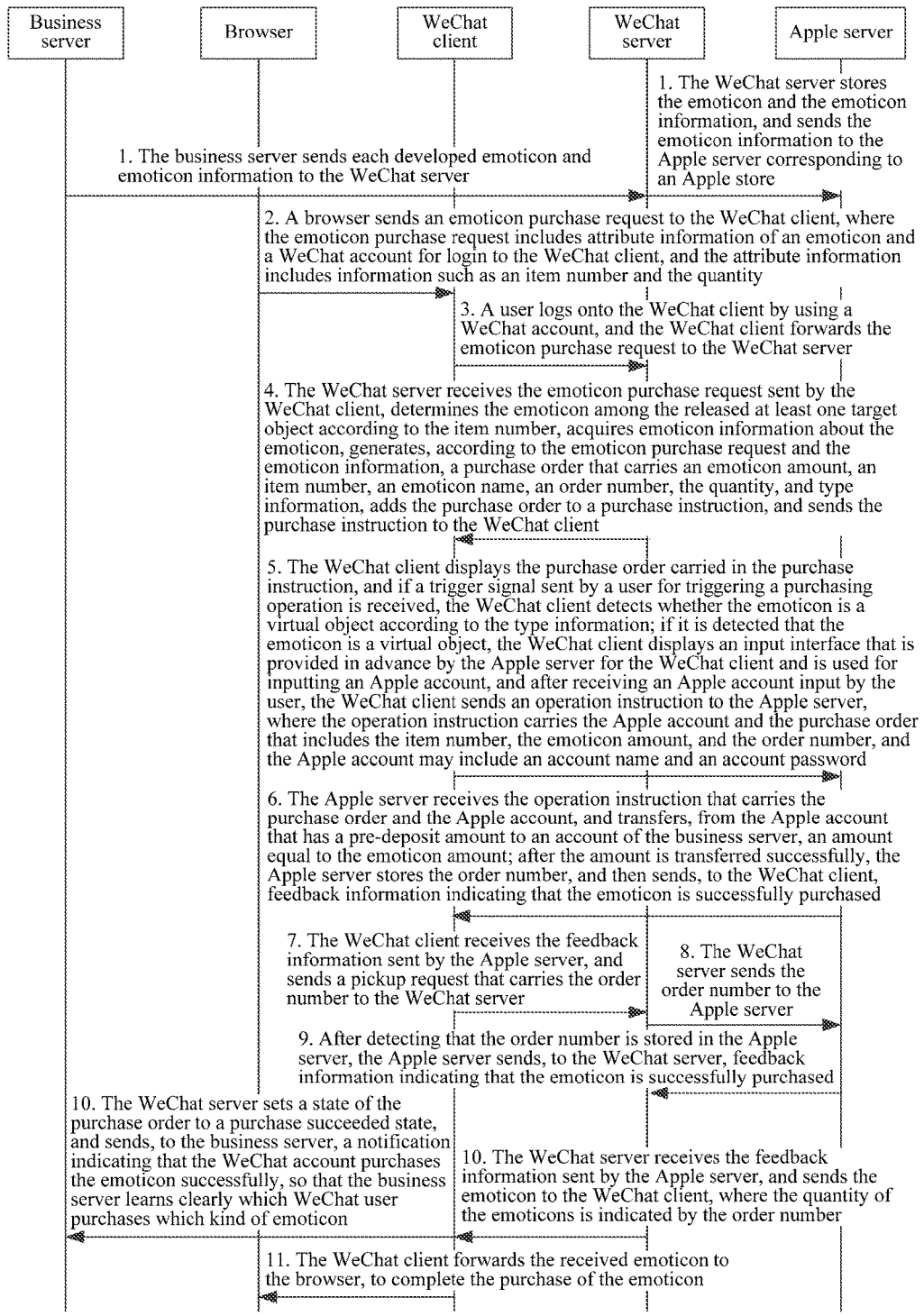
FIG. 4B is schematic diagram of an application of a data processing method according to an embodiment of the present invention.

Referring to the schematic diagram of an application of a data processing procedure shown in FIG. 4B. In this embodiment, an application of a data processing method is further described by using an example in which a target object is an emoticon and a data processing system includes a business server, a browser, a WeChat client, a WeChat server, and an Apple server, and the method is specifically as follows:

1. A business server sends each developed emoticon and emoticon information to a WeChat server, where the emoticon information includes an item number, an emoticon name, an emoticon amount, emoticon image-text introduction information, and the like; the WeChat server stores the emoticon and the emoticon information, and sends the emoticon information to an Apple server corresponding to an Apple store.

2. A browser sends an emoticon purchase request to a WeChat client, where the emoticon purchase request includes attribute information of an emoticon and a WeChat account for login to the WeChat client, and the attribute information includes information such as an item number and the quantity.

3. A user logs onto the WeChat client by using a WeChat account, and the WeChat client forwards the emoticon purchase request to the WeChat server.

4. The WeChat server receives the emoticon purchase request sent by the WeChat client, determines the emoticon among the released at least one target object according to the item number, acquires emoticon information about the emoticon, generates, according to the emoticon purchase request and the emoticon information, a purchase order that carries an emoticon amount, an item number, an emoticon name, an order number, the quantity, and type information, adds the purchase order to a purchase instruction, and sends the purchase instruction to the WeChat client.

5. The WeChat client displays the purchase order carried in the purchase instruction, and if a trigger signal sent by a user for triggering a purchasing operation is received, the WeChat client detects whether the emoticon is a virtual object according to the type information; if it is detected that the emoticon is a virtual object, the WeChat client displays an input interface that is provided in advance by the Apple server for the WeChat client and is used for inputting an Apple account, and after receiving an Apple account input by the user, the WeChat client sends an operation instruction to the Apple server, where the operation instruction carries the Apple account and the purchase order that includes the item number, the emoticon amount, and the order number, and the Apple account may include an account name and an account password.

6. The Apple server receives the operation instruction that carries the purchase order and the Apple account, and transfers, from the Apple account that has a pre-deposit amount to an account of the business server, an amount equal to the emoticon amount; after the amount is transferred successfully, the Apple server stores the order number, and then sends, to the WeChat client, feedback information indicating that the emoticon is successfully purchased.

7. The WeChat client receives the feedback information sent by the Apple server, and sends a pickup request that carries the order number to the WeChat server.

8. The WeChat server sends the order number to the Apple server.

9. After detecting that the order number is stored in the Apple server, the Apple server sends, to the WeChat server, feedback information indicating that the emoticon is successfully purchased.

10. The WeChat server receives the feedback information sent by the Apple server, sends the emoticon to the WeChat client, where the quantity of the emoticons is indicated by the order number, sets a state of the purchase order to a purchase succeeded state, and sends, to the business server, a notification indicating that the WeChat account purchases the emoticon successfully, so that the business server learns clearly which WeChat user purchases which kind of emoticon.

11. The WeChat client forwards the received emoticon to the browser, to complete the purchase of the emoticon.

Figure 5:
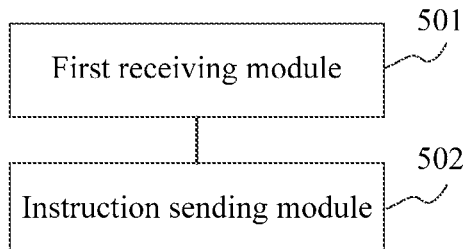
FIG. 5 is a structural block diagram of a data processing apparatus according to an embodiment of the present invention.

Referring to FIG. 5, FIG. 5 shows a structural block diagram of a data processing apparatus according to an embodiment of the present invention, where the data processing apparatus is applicable to a resource platform server, and a target object provider releases target object information on the resource platform server and a resource transfer server. The data processing apparatus includes:

a first receiving module 501, configured to receive a target object transfer request sent by a client, where the target object transfer request carries an account identifier of the client and attribute information of a target object; and an instruction sending module 502, configured to generate a target object transfer instruction according to the target object transfer request received by the first receiving module 501 and send the target object transfer instruction to the client, where the target object transfer instruction includes target object transfer information, and the target object transfer information includes exchange resource information corresponding to the target object, so that the client receives the target object transfer instruction, generates an operation instruction according to transfer confirmation performed on the target object transfer information carried in the target object transfer instruction, and sends the operation instruction to the resource transfer server, and the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

In summary, in the data processing apparatus provided by this embodiment of the present invention, a target object provider releases target object information on a resource platform server and a resource transfer server; the resource platform server receives a target object transfer request sent by a client, generates a target object transfer instruction according to the target object transfer request and sends the target object transfer instruction to the client; the client generates an operation instruction according to transfer confirmation information performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

Figure 6:
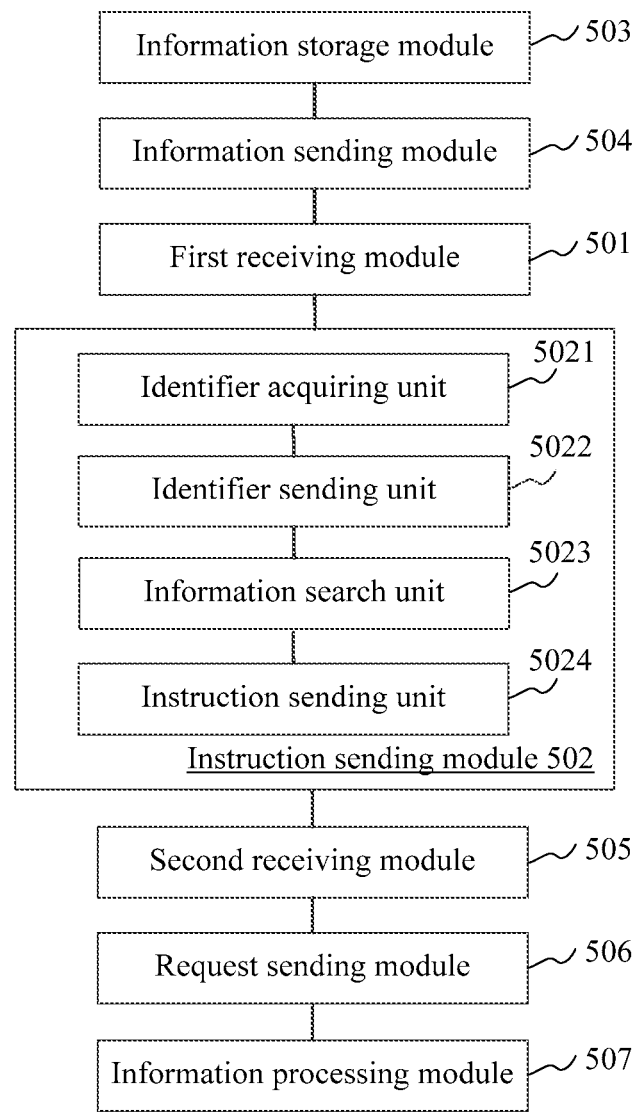
FIG. 6 is a structural block diagram of a data processing apparatus according to another embodiment of the present invention.

Referring to FIG. 6, FIG. 6 shows a structural block diagram of a data processing apparatus according to another embodiment of the present invention, where the data processing apparatus is applicable to a resource platform server, and a target object provider releases target object information on the resource platform server and a resource transfer server. The data processing apparatus includes a first receiving module 501 and an instruction sending module 502.

The first receiving module 501 is configured to receive a target object transfer request sent by a client, where the target object transfer request carries an account identifier of the client and attribute information of a target object.

The instruction sending module 502 is configured to generate a target object transfer instruction according to the target object transfer request received by the first receiving module 501 and send the target object transfer instruction to the client, where the target object transfer instruction includes target object transfer information, and the target object transfer information includes exchange resource information corresponding to the target object, so that the client receives the target object transfer instruction, generates an operation instruction according to transfer confirmation performed on the target object transfer information carried in the target object transfer instruction, and sends the operation instruction to the resource transfer server, and the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

Optionally, the instruction sending module 502 includes:

an identifier acquiring unit 5021, configured to acquire a target object identifier included in the attribute information;

an identifier sending unit 5022, configured to send the target object identifier acquired by the identifier acquiring unit 5021 to the resource transfer server, so that when finding target object information that includes the target object identifier among pre-stored target object information, the resource transfer server sends the found target object information to the resource platform server;

an information search unit 5023, configured to receive the target object information that is found according to the target object identifier sent by the identifier sending unit 5022, and search each piece of pre-stored target object information for target object information the same as the found target object information; and an instruction sending unit 5024, configured to: after the information search unit 5023 finds target object information the same as the found target object information, generate the target object transfer instruction according to the target object information and the account identifier and send the target object transfer instruction to the client.

Optionally, the apparatus further includes:

an information storage module 503, configured to receive and store at least one target object and target object information of each target object that are sent by the target object provider; and an information sending module 504, configured to send each piece of target object information stored by the information storage module 503 to the resource transfer server, so that the resource transfer server receives and stores each piece of target object information.

Optionally, the apparatus further includes:

a second receiving module 505, configured to receive a target object acquiring request sent by the client, where the target object acquiring request carries the target object transfer information;

a request sending module 506, configured to send the target object acquiring request received by the second receiving module 505 to the resource transfer server, so that the resource transfer server searches each piece of pre-recorded target object transfer information for the target object transfer information carried in the target object acquiring request, and if the target object transfer information carried in the target object acquiring request is found, sends target object transfer confirmation information to the resource platform server; and;

an information processing module 507, configured to send the target object to the client according to the target object transfer confirmation information.

In summary, in the data processing apparatus provided by this embodiment of the present invention, a target object provider releases target object information on a resource platform server and a resource transfer server; the resource platform server receives a target object transfer request sent by a client, generates a target object transfer instruction according to the target object transfer request and sends the target object transfer instruction to the client; the client generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process. In addition, the resource platform server searches locally for target object information the same as target object information sent by the resource transfer server, and in this way, a target object can be transferred when it is determined that the resource transfer server maintains the target object information, thereby avoiding a waste of processing resources caused by transfer of a target object that is not maintained by the resource transfer server.

Figure 7:
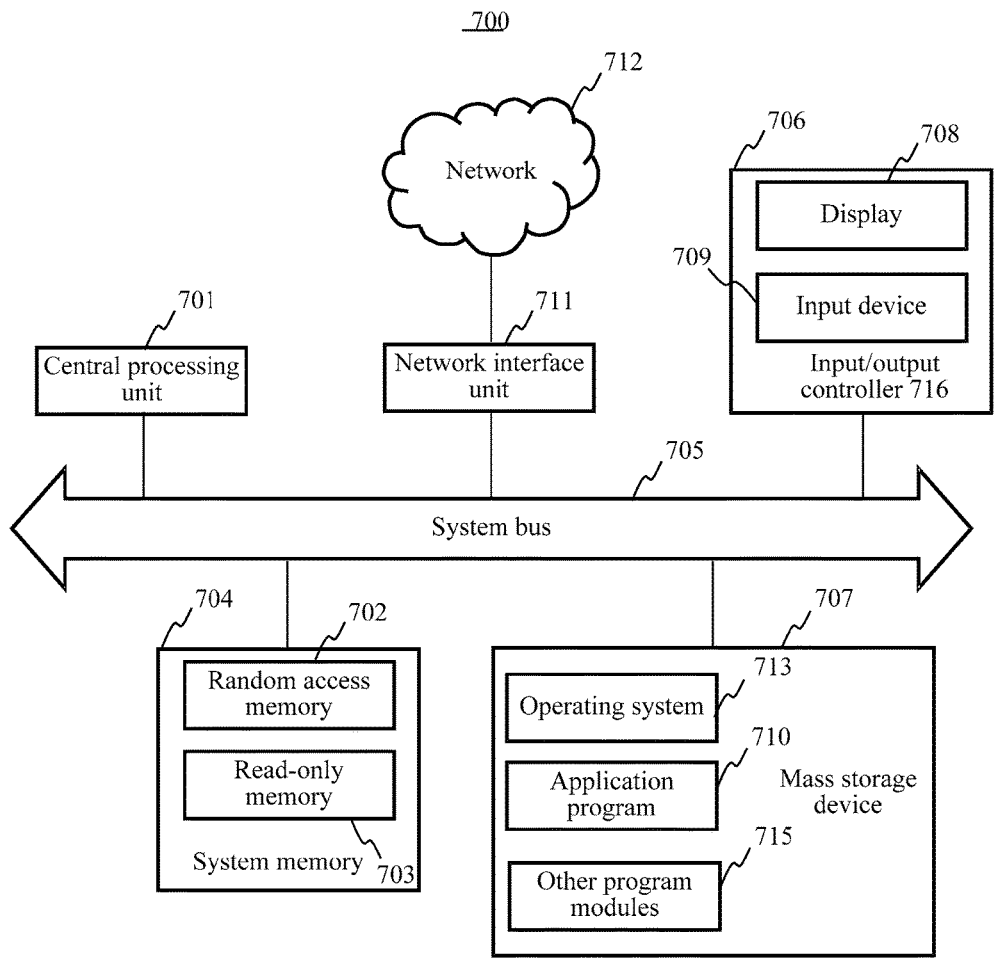
FIG. 7 is a structural block diagram of a resource platform server according to an embodiment of the present invention.

Referring to FIG. 7, FIG. 7 shows a schematic structural diagram of a resource platform server according to an embodiment of the present invention. The resource platform server 700 includes a central processing unit (CPU) 701, a system memory 704 that includes a random access memory (RAM) 702 and a read-only memory (ROM) 703, and a system bus 705 that connects the system memory 704 and the CPU 701. The resource platform server 700 further includes a basic input/output system (I/O system) 706 that assists information transmission between devices in a computer, and a mass storage device 707 configured to store an operating system 713, an application program 710 and other program modules 715.

The basic I/O system 706 includes a display 708 configured to display information and an input device 709 such as a mouse and a keyboard used by a user to input information. Both the display 708 and the input device 709 are connected to the CPU 701 by being connected to the I/O system controller 716 of the system bus 705. The basic I/O system 706 may further include the I/O system controller 716 to receive and process input from multiple other devices such as a keyboard, a mouse, or an electronic stylus. Similarly, the I/O system controller 716 further provides output to a display screen, a printer, or other types of output devices.

The mass storage device 707 is connected to the CPU 701 by being connected to a mass storage controller (not shown) of the system bus 705. The mass storage device 707 and a computer readable medium related thereto provide non-volatile storage for the resource platform server 700. In other words, the mass storage device 707 may include a computer readable medium (not shown) such as a hard disk or a CD-ROM drive.

Generally, the computer readable medium may include a computer storage medium and a communication medium. The computer storage medium may include volatile and non-volatile, and mobile and immobile media implemented by any method or technology for storing information such as a computer readable instruction, a data structure, a program module or other data. The computer storage medium includes a RAM, a ROM, an EPROM, an EEPROM, a flash memory or other solid state storage technology; a CD-ROM, a DVD or other optical storage; and a cassette, a magnetic tape, magnetic disk storage, or other magnetic storage devices. Certainly, a person skilled in the art may know that the computer storage medium is not limited to the types described above. The foregoing system memory 704 and the mass storage device 707 may be collectively referred to as a memory.

According to various embodiments of the present invention, the resource platform server 700 may further be connected to a remote computer on a network by means of a network connection such as the Internet, and run thereon. That is, the resource platform server 700 may be connected to a network 712 by being connected to an network interface unit 711 on the system bus 705, or in other words, the resource platform server 700 is connected to other types of networks or a remote computer system (not shown) by using the network interface unit 711.

The memory further includes one or more programs, where the one or more programs are stored in the memory, and the one or more programs have the following functions:

receiving a target object transfer request sent by a client, where the target object transfer request carries an account identifier of the client and attribute information of a target object; and generating a target object transfer instruction according to the target object transfer request, and sending the target object transfer instruction to the client, where the target object transfer instruction includes target object transfer information, and the target object transfer information includes exchange resource information corresponding to the target object, so that the client receives the target object transfer instruction, generates an operation instruction according to transfer confirmation performed on the target object transfer information carried in the target object transfer instruction, and sends the operation instruction to a resource transfer server, and the resource transfer server receives the operation instruction, transfers, according to the operation instruction, an exchange resource that corresponds to the target object from a first resource account associated with the account identifier of the client to a second resource account associated with a target object provider, and returns, to the client, information indicating that the exchange resource is transferred successfully.

Optionally, the generating a target object transfer instruction according to the target object transfer request and sending the target object transfer instruction to the client includes:

acquiring a target object identifier included in the attribute information;

sending the target object identifier to the resource transfer server, so that when finding target object information that includes the target object identifier among pre-stored target object information, the resource transfer server sends the found target object information to the resource platform server;

receiving the found target object information, and searching each piece of pre-stored target object information for target object information the same as the found target object information; and if target object information the same as the found target object information is found, generating the target object transfer instruction according to the target object information and the account identifier and sending the target object transfer instruction to the client.

Optionally, before the acquiring a target object identifier included in the target object information, the functions further include:

receiving and storing at least one target object and target object information of each target object that are sent by the target object provider; and sending each piece of target object information to the resource transfer server, so that the resource transfer server receives and stores each piece of target object information.

Optionally, after the generating a target object transfer instruction according to the target object transfer request and sending the target object transfer instruction to the client, the functions further include:

receiving a target object acquiring request sent by the client, where the target object acquiring request carries the target object transfer information;

sending the target object acquiring request to the resource transfer server, so that the resource transfer server searches each piece of pre-recorded target object transfer information for the target object transfer information carried in the target object acquiring request, and if the target object transfer information carried in the target object acquiring request is found, sends target object transfer confirmation information to the resource platform server; and sending the target object to the client according to the received target object transfer confirmation information.

Figure 8:
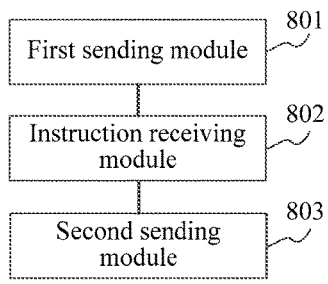
FIG. 8 is a structural block diagram of a data processing apparatus according to an embodiment of the present invention.

Referring to FIG. 8, FIG. 8 shows a structural block diagram of a data processing apparatus according to an embodiment of the present invention, where the data processing apparatus is applicable to a client, and a target object provider releases target object information on a resource platform server and a resource transfer server. The data processing apparatus includes:

a first sending module 801, configured to send a target object transfer request to the resource platform server, where the target object transfer request carries an account identifier of the client and attribute information of a target object;

an instruction receiving module 802, configured to receive a target object transfer instruction sent by the resource platform server, where the target object transfer instruction is generated by the resource platform server according to the target object transfer request sent by the first sending module 801 and is sent to the client, the target object transfer instruction includes target object transfer information, and the target object transfer information includes exchange resource information corresponding to the target object; and a second sending module 803, configured to generate an operation instruction according to transfer confirmation performed on the target object transfer information carried in the target object transfer instruction received by the instruction receiving module 802, and send the operation instruction to the resource transfer server, so that the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

In summary, in the data processing apparatus provided by this embodiment of the present invention, a target object provider releases target object information on a resource platform server and a resource transfer server; a client sends a target object transfer request to the resource platform server, receives a target object transfer instruction that is generated by the resource platform server according to the target object transfer request, and generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

Figure 9:
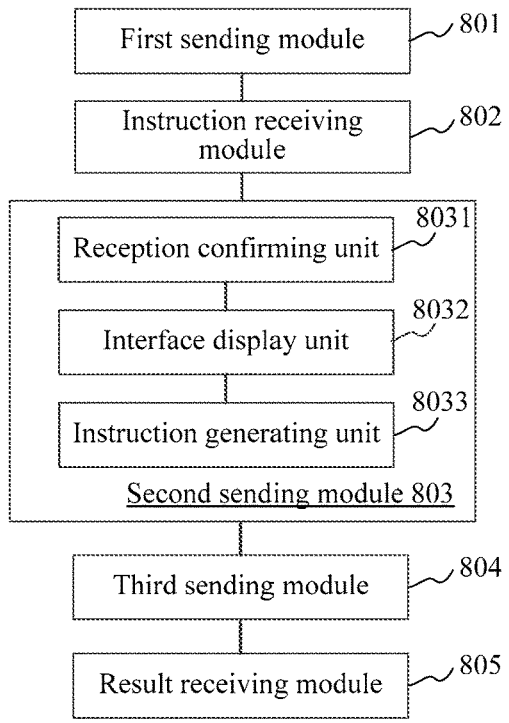
FIG. 9 is a structural block diagram of a data processing apparatus according to another embodiment of the present invention.

Referring to FIG. 9, FIG. 8 shows a structural block diagram of a data processing apparatus according to an embodiment of the present invention, where the data processing apparatus is applicable to a client, and a target object provider releases target object information on a resource platform server and a resource transfer server. The data processing apparatus includes: a first sending module 801, an instruction receiving module 802, and a second sending module 803.

The first sending module 801 is configured to send a target object transfer request to the resource platform server, where the target object transfer request carries an account identifier of the client and attribute information of a target object.

The instruction receiving module 802 is configured to receive a target object transfer instruction sent by the resource platform server, where the target object transfer instruction is generated by the resource platform server according to the target object transfer request sent by the first sending module 801 and is sent to the client, the target object transfer instruction includes target object transfer information, and the target object transfer information includes exchange resource information corresponding to the target object.

The second sending module 803 is configured to generate an operation instruction according to transfer confirmation performed on the target object transfer information carried in the target object transfer instruction received by the instruction receiving module 802, and send the operation instruction to the resource transfer server, so that the resource transfer server receives the operation instruction, transfers, according to the operation instruction, an exchange resource that corresponds to the target object from a first resource account associated with the account identifier of the client to a second resource account associated with the target object provider, and returns, to the client, information indicating that the exchange resource is transferred successfully.

Optionally, the second sending module 803 includes:

a reception confirming unit 8031, configured to: when the target object transfer instruction is triggered, determine that transfer confirmation performed on the target object transfer information is received;

an interface display unit 8032, configured to display an input interface that is provided in advance by the resource transfer server for the client and is used for inputting the first resource account; and an instruction generating unit 8033, configured to generate the operation instruction according to the target object transfer information and the first resource account input in the input interface displayed by the interface display unit 8032.

Optionally, the apparatus further includes:

a third sending module 804, configured to send a target object acquiring request to the resource platform server, where the target object acquiring request carries the target object transfer information, so that the resource platform server sends the received target object acquiring request to the resource transfer server, the resource transfer server receives the target object acquiring request, searches each piece of pre-recorded target object transfer information for the target object transfer information carried in the target object acquiring request, and if the target object transfer information carried in the target object acquiring request is found, sends target object transfer confirmation information to the resource platform server, and the resource platform server sends the target object to the client according to the received target object transfer confirmation information; and a result receiving unit 805, configured to receive the target object that is sent by the resource platform server according to the target object acquiring request sent by the third sending module.

In summary, in the data processing apparatus provided by this embodiment of the present invention, a target object provider releases target object information on a resource platform server and a resource transfer server; a client sends a target object transfer request to the resource platform server, receives a target object transfer instruction that is generated by the resource platform server according to the target object transfer request, and generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

Figure 10:
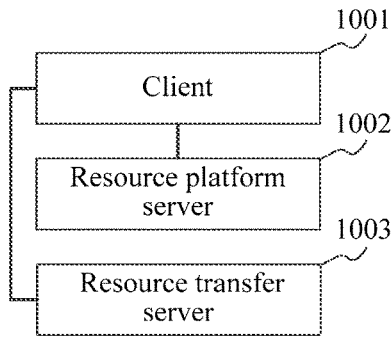
FIG. 10 is a structural block diagram of a data processing system according to an embodiment of the present invention.

Referring to FIG. 10, FIG. 10 shows a structural block diagram of a data processing system according to an embodiment of the present invention. The data processing system includes a client 1001, a resource platform server 1002, and a resource transfer server 1003; a target object provider releases target object information on the resource platform server 1002 and the resource transfer server 1003; the client 1001, the resource platform server 1002, and the resource transfer server 1003 are connected through a wired network or a wireless network.

The client 1001 is configured to send a target object transfer request to the resource platform server 1002, where the target object transfer request carries an account identifier of the client and attribute information of a target object.

The resource platform server 1002 is configured to receive the target object transfer request, generate a target object transfer instruction according to the target object transfer request, and send the target object transfer instruction to the client 1001, where the target object transfer instruction includes target object transfer information, and the target object transfer information includes exchange resource information corresponding to the target object.

The client 1001 is further configured to receive the target object transfer instruction, generate an operation instruction according to transfer confirmation performed on the target object transfer information carried in the target object transfer instruction, and send the operation instruction to the resource transfer server 1003.

The resource transfer server 1003 is configured to receive the operation instruction, transfer, according to the operation instruction, an exchange resource that corresponds to the target object from a first resource account associated with the account identifier of the client 1001 to a second resource account associated with the target object provider, and return, to the client, information indicating that the exchange resource is transferred successfully.

Further, the client 1001 may be the client shown in FIG. 8 or FIG. 9, and the resource platform server 1002 may be the resource platform server shown in FIG. 5, 6, or 7.

In summary, in the data processing system provided by this embodiment of the present invention, a target object provider releases target object information on a resource platform server and a resource transfer server; a client sends a target object transfer request to the resource platform server; the resource platform server generates a target object transfer instruction according to the target object transfer request and sends the target object transfer instruction to the client; the client generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process.

Figure 11:
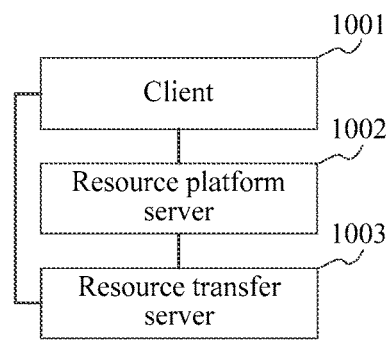
FIG. 11 is a structural block diagram of a data processing apparatus according to another embodiment of the present invention.

Referring to FIG. 11, FIG. 11 shows a structural block diagram of a data processing system according to another embodiment of the present invention. The data processing system includes a client 1001, a resource platform server 1002, and a resource transfer server 1003; a target object provider releases target object information on the resource platform server 1002 and the resource transfer server 1003; the client 1001, the resource platform server 1002, and the resource transfer server 1003 are connected through a wired network or a wireless network.

The client 1001 is configured to send a target object transfer request to the resource platform server 1002, where the target object transfer request carries an account identifier of the client and attribute information of a target object.

The resource platform server 1002 is configured to receive the target object transfer request, generate a target object transfer instruction according to the target object transfer request, and send the target object transfer instruction to the client 1001, where the target object transfer instruction includes target object transfer information, and the target object transfer information includes exchange resource information corresponding to the target object.

The client 1001 is further configured to receive the target object transfer instruction, generate an operation instruction according to transfer confirmation performed on the target object transfer information carried in the target object transfer instruction, and send the operation instruction to the resource transfer server 1003.

The resource transfer server 1003 is configured to receive the operation instruction, transfer, according to the operation instruction, an exchange resource that corresponds to the target object from a first resource account associated with the account identifier of the client 1001 to a second resource account associated with the target object provider, and return, to the client, information indicating that the exchange resource is transferred successfully.

Optionally, the resource platform server 1002 is further configured to acquire a target object identifier included in the attribute information, and send the target object identifier to the resource transfer server 1003.

The resource transfer server 1003 is further configured to search each piece of pre-stored target object information for target object information that includes the target object identifier, and if target object information that includes the target object identifier, send the found target object information to the resource platform server 1002.

The resource platform server 1002 is further configured to receive the found target object information, search each piece of pre-stored target object information for target object information the same as the found target object information, and if target object information the same as the found target object information is found, generate the target object transfer instruction according to the target object information and the account identifier, and send the target object transfer instruction to the client 1001.

Optionally, the resource platform server 1002 is further configured to receive and store at least one target object and target object information of each target object that are sent by the target object provider, and send each piece of target object information to the resource transfer server 1003.

The resource transfer server 1003 is further configured to receive and store each piece of target object information.

Optionally, the client 1001 is further configured to determine that transfer confirmation performed on the target object transfer information is received when the target object transfer instruction is triggered, display an input interface that is provided in advance by the resource transfer server 1003 for the client 1001 and used for inputting the first resource account, and generate the operation instruction according to the target object transfer information and the input first resource account.

Optionally, the client 1001 is further configured to send a target object acquiring request to the resource platform server 1002, where the target object acquiring request carries the target object transfer information.

The resource platform server 1002 is further configured send the received target object acquiring request to the resource transfer server 1003.

The resource transfer server 1003 is further configured to receive the target object acquiring request, search each piece of pre-recorded target object transfer information for the target object transfer information carried in the target object acquiring request, and if the target object transfer information carried in the target object acquiring request is found, send target object transfer confirmation information to the resource platform server 1002.

The resource platform server 1002 is further configured to send the target object to the client 1001 according to the received target object transfer confirmation information.

Further, the client 1001 may be the client shown in FIG. 8 or FIG. 9, and the resource platform server 1002 may be the resource platform server shown in FIG. 5, 6, or 7.

In summary, in the data processing system provided by this embodiment of the present invention, a target object provider releases target object information on a resource platform server and a resource transfer server; a client sends a target object transfer request to the resource platform server; the resource platform server generates a target object transfer instruction according to the target object transfer request and sends the target object transfer instruction to the client; the client generates an operation instruction according to transfer confirmation performed on target object transfer information carried in the target object transfer instruction and sends the operation instruction to the resource transfer server; the resource transfer server transfers, according to the operation instruction, an exchange resource that corresponds to a target object from a first resource account associated with an account identifier of the client to a second resource account associated with the target object provider. A client and a resource platform server that are specifically used for interacting with a resource transfer server are provided, and when the client and the resource platform server are highly secure, a process of transferring a target object through the client and the resource platform server by each target object provider is highly secure, which solves the problem that a client and a resource platform server developed by a target object provider is insecure and may cause leakage of private information such as resource accounts of users, and achieves an effect of improving the security of a target object transfer process. In addition, the resource platform server searches locally for target object information the same as target object information sent by the resource transfer server, and in this way, a target object can be transferred when it is determined that the resource transfer server maintains the target object information, thereby avoiding a waste of processing resources caused by transfer of a target object that is not maintained by the resource transfer server.

It should be noted that: when the data processing apparatus and the data processing system provided by the foregoing embodiments are used to process data, description is made merely by using the division of the foregoing functional modules as an example. In an actual application, the foregoing functions may be assigned to different functional modules, that is, the internal structure of the data processing apparatus and the data processing system is divided into different functional modules to complete all or some of the functions described above. In addition, the data processing apparatus and the data processing system provided by the foregoing embodiments belong to the same thinking as the embodiment of the data processing method. For the specific implementation process of the data processing apparatus and the data processing system, refer to the method embodiment, and details are not provided herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A method comprising:
   at a first server for an instant messaging service:
   receiving, from a second server that is distinct from the first server, a plurality of emoticons and information associated with the plurality of emoticons, wherein the information associated with the plurality of emoticons includes an identifier for each of the plurality of emoticons,
   sending, to a third server that is distinct from the first server and the second server, the information for the plurality of emoticons;
   receiving, from an electronic device logged into a first account associated with the instant messaging service, a first request for a first emoticon;
   after receiving the first request from the electronic device: (i) determining that the first emoticon is one of the plurality of emoticons received from the second server using the information; (ii) generating an order for the first emoticon in response to determining that the first emoticon is one of the plurality of emoticons, the order including a first identifier of the first emoticon and an order number for the first request, and (iii) sending the order to the electronic device, wherein:
      the electronic device sends the received order to the third server by logging into a second account associated with the third server; and
      upon receiving the order from the electronic device, the third server transfers an amount of funds from the second account to the second server, the amount of funds being determined based on the first identifier of the first emoticon, the third server being configured to store the order number after the funds are successfully transferred;
   receiving, from the electronic device, a second request for the first emoticon of the plurality of emoticons, the second request including the order number;
   upon receiving the second request, sending, to the third server, a third request for confirmation that the funds successfully transferred from the second account to the second server; and
   in response to receiving confirmation of the transfer from the third server, providing the first emoticon of the plurality of emoticons to the electronic device.

2. The method of claim 1, wherein a stipulation is carried with each of the plurality of emoticons that the third server is to be involved during transfer of each emoticon from the first server to a respective electronic device.

3. The method of claim 2, wherein the electronic device sends the received order to the third server after determining that the stipulation is carried with the first emoticon.

4. The method of claim 1, further comprising, at the first server:
   after providing the first emoticon to the electronic device, sending a notification to the second server, the notification notifying the second server that the first emoticon was provided to the electronic device.

5. The method of claim 1, wherein the order further includes the amount of funds and a quantity of first emoticons.

6. A first server for an instant messaging service, comprising:
   one or more processors; and
   memory storing one or more programs for execution by the one or more processors, the one or more programs including instructions for:
   receiving, from a second server that is distinct from the first server, a plurality of emoticons and information associated with the plurality of emoticons, wherein the information associated with the plurality of emoticons includes an identifier for each of the plurality of emoticons,
   sending, to a third server that is distinct from the first server and the second server, the information for the plurality of emoticons;
   receiving, from an electronic device logged into a first account associated with the instant messaging service, a first request for a first emoticon;
   after receiving the first request from the electronic device: (i) determining that the first emoticon is one of the plurality of emoticons received from the second server using the information, (ii) generating an order for the first emoticon in response to determining that the first emoticon is one of the plurality of emoticons, the order including a first identifier of the first emoticon and an order number for the first request, and (iii) sending the order to the electronic device, wherein:
      the electronic device sends the received order to the third server by logging into a second account associated with the third server; and
      upon receiving the order from the electronic device, the third server transfers an amount of funds from the second account to the second server, the amount of funds being determined based on the first identifier of the first emoticon, the third server being configured to store the order number after the funds are successfully transferred;
   receiving, from the electronic device, a second request for the first emoticon of the plurality of emoticons, the second request including the order number;
   upon receiving the second request, sending, to the third server, a third request for confirmation that the funds successfully transferred from the second account to the second server; and
   in response to receiving confirmation of the transfer from the third server, providing the first emoticon of the plurality of emoticons to the electronic device.

7. The first server of claim 6, wherein a stipulation is carried with each of the plurality of emoticons that the third server is to be involved during transfer of each emoticon from the first server to a respective electronic device.

8. The first server of claim 7, wherein the electronic device sends the received order to the third server after determining that the stipulation is carried with the first emoticon.

9. The first server of claim 6, wherein the one or more programs further include instructions for:
   after providing the first emoticon to the electronic device, sending a notification to the second server, the notification notifying the second server that the first emoticon was provided to the electronic device.

10. The first server of claim 6, wherein the order further includes the amount of funds and a quantity of first emoticons.

11. A non-transitory computer-readable storage medium, storing one or more programs configured for execution by one or more processors of a first server of an instant messaging service, the one or more programs including instructions, which when executed by the one or more processors cause the first server to:
- receive, from a second server that is distinct from the first server, a plurality of emoticons and information associated with the plurality of emoticons, wherein the information associated with the plurality of emoticons includes an identifier for each of the plurality of emoticons,
- send, to a third server that is distinct from the first server and the second server, the information for the plurality of emoticons;
- receive, from an electronic device logged into a first account associated with the instant messaging service, a first request for a first emoticon;
- after receiving the first request from the electronic device:
  (i) determine that the first emoticon is one of the plurality of emoticons received from the second server using the information, (ii) generate an order for the first emoticon in response to determining that the first emoticon is one of the plurality of emoticons, the order including a first identifier of the first emoticon and an order number for the first request, and (iii) send the order to the electronic device, wherein:
  - the electronic device sends the received order to the third server by logging into a second account associated with the third server; and
  - upon receiving the order from the electronic device, the third server transfers an amount of funds from the second account to the second server, the amount of funds being determined based on the first identifier of the first emoticon, the third server being configured to store the order number after the funds are successfully transferred;
- receive, from the electronic device, a second request for the first emoticon of the plurality of emoticons, the second request including the order number;
- upon receiving the second request, send, to the third server, a third request for confirmation that the funds successfully transferred from the second account to the second server; and
- in response to receiving confirmation of the transfer from the third server, provide the first emoticon of the plurality of emoticons to the electronic device.

12. The non-transitory computer-readable storage medium of claim 11, wherein a stipulation is carried with each of the plurality of emoticons that the third server is to be involved during transfer of each emoticon from the first server to a respective electronic device.

13. The non-transitory computer-readable storage medium of claim 12, wherein the electronic device sends the received order to the third server after determining that the stipulation is carried with the first emoticon.

14. The non-transitory computer-readable storage medium of claim 11, wherein the one or more programs further include instructions, which when executed by the one or more processors cause the first server to:
- after providing the first emoticon to the electronic device, send a notification to the second server, the notification notifying the second server that the first emoticon was provided to the electronic device.

15. The non-transitory computer-readable storage medium of claim 11, wherein the order further includes the amount of funds and a quantity of first emoticons.

* * * * *